Patented Mar. 5, 1940

2,192,721

UNITED STATES PATENT OFFICE 2,192,721

PREPARATION OF SULPHURIC ACID DERIVATIVES OF FATTY ACID DIESTERS OF GLYCOLS

Gilbert C. Toone, Hamburg, N. Y., assignor to National Aniline & Chemical Company, Incorporated, New York, N. Y., a corporation of New York No Drawing. Application February 19, 1937, Serial No. 126,736

17 Claims. (Cl. 260—400)

The present invention relates to an improved process for the preparation of sulphuric acid derivatives of fatty acid diesters of glycols, which derivatives are characterized by their high wetting power.

An object of the present invention is to provide a process for the preparation of sulphuric acid derivatives of fatty acid diesters of glycols in the form of their salts whereby products are obtained possessing wetting power in a marked degree.

Another object of the invention is to provide improvements in the process of converting sulphuric acid derivatives of fatty acid diesters of glycols in the form of their free acids to their salts whereby the wetting power of the products is materially increased.

A further object of the invention is to produce a composition comprising a sulphuric acid derivative of a fatty acid diester of a glycol in the form of a salt having materially greater wetting power than similar compositions heretofore produced.

Other objects of the invention will in part be obvious and will in part appear hereinafter.

As a comparatively recent development in the field of assistants for use in the wet treatment of textile and related materials, it has been proposed to prepare agents having wetting, dispersing, and penetrating properties by sulphating and/or sulphonating fatty acid diesters of glycols. The agents are fatty acid diesters of glycols in which at least one of the fatty acid residues contains at least one sulphuric acid residue (a sulphate or sulphonate group in the form of a free acid or a salt thereof).

In the preparation of the products of the above type, a fatty acid diester of a glycol which ester contains at least one fatty acid residue capable of reacting with a sulphonating agent is reacted with a sulphonating agent such as, for example, concentrated sulphuric acid, oleum, chlorsulphonic acid, and the like, at a low temperature. In the further treatment of the reaction mass, as heretofore carried out, the mass is cooled and allowed to separate into an upper oily layer and a lower aqueous layer, the upper oily layer is separated and is then neutralized with an aqueous solution of an alkali (e. g., caustic soda), the neutralized mass is saturated with common salt, and the resulting oil is separated and filtered. The product thus obtained as an oil consists principally of a sodium salt of a sulphuric derivative (sulphate or sulphonate) of a fatty acid diester of a glycol, and possesses wetting, emulsifying, and penetrating properties.

According to the present invention, a sulphuric acid derivative of a fatty acid diester of a glycol, in the form of its free acid and especially when resulting from the reaction of a sulphonating agent on a fatty acid diester of a glycol, is converted to a salt thereof in a reaction medium comprising a water miscible monohydric alcohol. I have found that the products obtained by such a procedure have superior properties to the salts obtained from the same reacting ingredients in the absence of the alcohol. Thus, I have found if a sulphuric acid derivative of a fatty acid diester of a glycol in the form of the free acid, and resulting from the sulphonation of a fatty acid diester of a glycol, is neutralized by treatment of the sulphonation product with caustic soda in a reaction medium containing a water miscible monohydric alcohol, the resulting salt of the sulphuric acid derivative of the glycol ester possesses wetting power in a greatly enhanced degree over the wetting power of the salts obtained by the same treatment in the absence of the alcohol. I have also found that the resulting product is stable and light in color. This result is surprising because the improvement in wetting action obtained with the aid of water miscible alcohol does not result from a subsequent treatment with the alcohol of the salts obtained in the absence of the alcohol; and further, according to United States Patent 1,943,431, the neutralization of the sulphuric acid derivative of ricinoleic acid with alcoholic caustic soda is unsuitable for the manufacture of the sodium salt thereof owing to attendant resinification and darkening of the products.

In order that the present invention may be more fully understood, reference should be had to the following specific examples in which preferred embodiments of the invention are disclosed. The parts are by weight and temperatures are in degrees centigrade.

*Example 1*

77 parts of 100% sulphuric acid are added uniformly over a period of about 1¼ hours to 175 parts of ethylene glycol dioleate. The mixture is agitated, and its temperature is maintained at approximately 0° by cooling during the addition of the sulphuric acid. After the addition of the acid is complete, the mass is agitated for about 1¾ hours longer at the same temperature. The sulphonation mixture is then added slowly to 140 parts of 96% ethyl alcohol which is maintained at a temperature of about 0°, and simultaneously an aqueous solution of sodium hydroxide (containing about 50% by weight of caustic soda) is added to the alcohol at a rate which maintains the alcoholic solution slightly alkaline at all times and finally to give an acid reaction to phenolphthalein, but an alkaline reaction of brilliant yellow. When all of the sulphonation mixture has been thus neutralized, the solution is heated to about 50°, and is filtered at this temperature. The filtrate comprises an aqueous solution of the sodium salt of ethylene glycol dioleate sulphate and ethyl alcohol. It is useful as such as a wetting agent in dyeing and other treatments of textile materials. The alcohol may be removed by distillation. The resulting product is an oily liquid, which may be evaporated to a viscous product resembling a soft soap. It is advantageously standardized by diluting with water until 100 parts contain an amount of the product equivalent to about 40 parts of oleic acid.

The product obtained according to this example is superior in wetting power to that which is obtained by employing the same ingredients and conditions but omitting the alcohol. Thus, when tested by the canvas-disc method, a small sample of canvas sinks in 40 seconds in a 0.1% aqueous solution at 50° of the product of the example, whereas it requires 150 seconds for a like sample of canvas to sink in a 0.1% aqueous solution at 50° of the product obtained when omitting the alcohol.

*Example 2*

A mixture of 912 parts of the dioleate of diethylene glycol and 365 parts of benzene is cooled to 5°, and to the agitated, cooled mixture there are added 456 parts of sulphuric acid monohydrate, the rate of addition of sulphuric acid being such that the temperature of the reaction mixture does not rise above 10°. After all of the sulphuric acid has been added (about 3 to 4 hours), the mixture is stirred while continuing the cooling, to permit substantial completion of the sulphonation (about 3 hours additional), the temperature of the mixture falling to about 0°. The resulting reaction mass is then slowly added with stirring to 456 parts of ethyl alcohol (denatured alcohol formula #2B) while simultaneously adding aqueous sodium hydroxide (containing about 50% by weight of caustic soda) whereby the sodium salt of the sulphonated dioleate of diethylene glycol is formed in the alcoholic reaction medium. The temperature is maintained at about 15° during the addition and the rates of addition are adjusted so as to maintain the alcoholic solution faintly alkaline (a faint pink to phenolphthalein). When the sulphonation mass has all been added, the alkalinity of the mixture is adjusted to give an acid reaction to phenolphthalein but an alkaline reaction to brilliant yellow. The resulting neutralized mixture is then heated to 30° and filtered, preferably with the addition of a filter aid, such as "Supercel" or a similar diatomaceous earth. The filtrate is subjected to careful distillation to remove the benzene and alcohol. The resulting product, which comprises an aqueous solution of the sodium salt of the monosulphate of the dioleate of diethylene glycol, may be employed as such, or concentrated by evaporation or distillation.

It will be understood the invention is not limited to the particular details or reagents disclosed in the foregoing examples. Thus, in place of ethyl alcohol, any other monohydric alcohol which is completely miscible with water may be employed, such as, for example, methyl, normal propyl, or isopropyl alcohols. While variance in the amount of alcohol employed is permissible, it is preferable to employ sufficient alcohol to dissolve the sulphonated diester. In general, about ½ to 2 parts by weight of the alcohol are employed for each part by weight of the fatty acid glycol diester subjected to sulphonation.

For the neutralization of the sulphonation mixture, it is preferable to employ alkali metal hydroxides, such as, for example, sodium hydroxide or potassium hydroxide. If desired, however, in place of the alkali metal hydroxides, alkali metal carbonates, alkali metal bicarbonates, ammonia, ammonium hydroxide, or salt-forming organic derivatives of ammonia, such as amines and quaternary ammonium bases, may be used in a similar manner to convert the product from the free acid to the salt form in accordance with the present invention. While the salt formation reaction is preferably carried to a stage of slight alkalinity or substantial neutrality, the reaction mixture may be acid or alkaline at the completion of the salt-forming reaction.

The neutralizing agent added to the sulphonation mixture may be in the solid or gaseous state, in alcoholic solution, or in aqueous solution. Where an aqueous solution of the neutralizing agent is employed, it is important to employ a solution of such concentration as to avoid excessive dilution of the alcoholic medium with water. Inasmuch as the alcohol aids in the separation of the product from sodium sulphate or other inorganic sulphates formed as a result of the neutralization of the excess sulphonating agent in the sulphonation mass, the amount of water present in the final alcoholic solution preferably should not be so great as to result in substantial solubility of the inorganic sulphate in the final alcoholic solution. In general, the total amount of water which may be present in the neutralization reaction mass at the completion of the neutralization preferably does not exceed about one part per part of alcohol, by weight.

The glycol diesters which form the starting materials in the production of the sulphuric acid derivatives may be prepared by any suitable procedure, a number of which are well-known. Thus, the glycol may be heated with a suitable fatty acid or a mixture of fatty acids under such conditions as to cause condensation to take place between the glycol and the acid. If desired, a mixture of fatty acids may be employed whereby a fatty acid diester of the glycol is produced which contains two different fatty acid residues. The condensation between a glycol and two different fatty acids may also be effected in successive steps. For example, a glycol may be first condensed with an amount of a fatty acid sufficient only to produce the monoester of the glycol and the resulting monoester may then be condensed with a different fatty acid.

The process of the present invention is not restricted to the treatment of sulphuric acid derivatives of fatty acid diesters of any particular class of glycols but may be applied to those derived from the various dihydric alcohols and their hydroxy alkyl ethers which contain only two free hydroxyl groups. For the purpose of illustration, the following specific glycols which are adapted for use in the production of the fatty acid diesters may be mentioned: the aliphatic dihydric alcohols ranging from ethylene glycol to the tetra-kosan-diols and higher (such as, propan-, butan-, petan-, hexan-, heptan-, octan-, nonan-, and decan-diols, stearylene glycol, etc.), and the polyalkalene glycols (such as di- to hexaethylene glycols, ethylene propylene diglycol, and the like).

The fatty acids employed for the preparation of the glycol diesters may be of varying constitution. It is preferred to use, however, unsaturated or hydroxy fatty acids containing three or more carbon atoms. Of especial interest and importance in accordance with the present invention are the sulphuric acid derivatives of fatty acid diesters of glycols which are derivable from fatty acids of this type containing ten to twenty-four carbon atoms, and particularly sixteen to eighteen carbon atoms; many of the fatty acid diesters of glycols with which the present invention is concerned being derivable from fatty acids which occur in combination in natural fats and oils of vegetable or animal origin. Thus, crotonic, tiglic, elaidic, erucic, brassidic, sorbic, oleic, linoleic, linolenic, glyceric, hydroxy caprylic, hydroxy myristic, mono- and dihydroxy stearic, and ricinoleic acids, and the like may be employed for the preparation of the glycol diesters.

The process of the present invention is adapted to the treatment of products obtained by sulphonating fatty acid diesters of glycols by any suitable sulphonation method; many of such methods being well-known. Thus, the process may be practiced with sulphuric acid derivatives prepared with the use of sulphonating agents such as oleum, chlorsulphonic acid, and the like. It has been found, however, that the present process is of particular value when applied to sulphuric acid derivatives prepared by treating with 100% sulphuric acid the fatty acid diesters of glycols, at least one of the fatty acid residues of which is unsaturated or contains a hydroxyl group. Compounds for promoting the sulphonation, such as phosphorus trichloride, phosphorus pentoxide, acetic anhydride, ethylchloride, and the like, may be employed, if desired, in the sulphonation of the diesters.

In the copending application of Lawrence H. Flett, Serial No. 31,864, filed July 17, 1935, now United States Patent No. 2,136,379, there are disclosed sulphuric acid derivatives of fatty acid diester of glycols. Salts of the free acids of such derivatives may advantageously be prepared by the present process.

In carrying out the neutralization of the sulphuric acid derivatives of the fatty acid diesters of glycols in accordance with the process of the present invention, the sulphonation mixture may first be mixed with the alcoholic medium and the neutralizing agent may then be added or the neutralizing agent may be mixed with the alcoholic medium followed by the addition of the sulphonation mixture. However, in accordance with the preferred procedure, the neutralizing agent and the sulphonation mixture are added simultaneously to the alcoholic medium. It has been found this latter procedure is of advantage especially in connection with the neutralization of the sulphonation mass resulting from the sulphonation of the diester with an excess of sulphonating agent in order to avoid side reactions which might result from the presence of a substantial excess of the sulphonation mixture or the neutralizing agent.

During the neutralization, the temperature is preferably maintained below about 20° C., as by suitable cooling means. After completion of the neutralization, the alcohol contained in the mixture may be removed by distillation and recovered and reused in the process, if desired.

While the process of the present invention is applicable for the treatment of the sulphuric acid derivatives of the fatty acid diesters of glycols of the various types mentioned above, it has been found to be particularly applicable for the preparation of neutralized sulphonation products of fatty diesters of glycols in which both of the fatty acid residues are oleic residues, especially ethylene glycol dioleate, and diethylene glycol dioleate.

By proceeding in accordance with the foregoing description, products may be prepared which are valuable as dispersing, emulsifying, and wetting agents characterized by their stability towards saponifying agents and property of remaining in solution in the presence of calcium salts. They are particularly characterized by their greatly increased wetting power over similar products formed by neutralizing the sulphonation mixture in an aqueous medium with the same neutralizing agents. Because of their superior dispersing and emulsifying properties, and particularly of their wetting action, they are especially useful as assistants in baths and other preparations for dyeing and otherwise treating textile materials.

Since, in carrying out the above process, changes may be made without departing from the scope of the invention, it is intended that all matter contained in the above description shall be interpreted as illustrative and not in a limiting sense; the scope of the invention being indicated in the claims.

I claim:

1. In the process for the preparation of a salt of a sulphuric acid derivative of a fatty acid diester of a glycol by treatment thereof in the form of its free acid with a neutralizing agent, the improvement which comprises carrying out the treatment in an alcoholic reaction medium wherein the alcohol is a water-miscible alcohol.

2. In the process for the preparation of a salt of a sulphuric acid ester of a fatty acid diester of a glycol by treatment thereof in the form of its free acid with a caustic alkali, the improvement which comprises carrying out the treatment in a reaction medium which is an aqueous alcoholic solution.

3. In the process for the preparation of a salt of a sulphuric acid ester of a fatty acid diester of a glycol containing at least one fatty acid residue of from 10 to 24 carbon atoms by treatment thereof in the form of its free acid with a neutralizing agent, the improvement which comprise carrying out the treatment in a reaction medium which is an aqueous alcoholic solution wherein the alcohol is a monohydric alcohol.

4. In the process for the preparation of a salt of a sulphuric acid ester of a fatty acid diester of a glycol by treatment thereof in the form of its free acid with a neutralizing agent, the improvement which comprises carrying out the treatment in an aqueous reaction medium comprising about one-half to about two parts by weight of a water-miscible monohydric alcohol for each part by weight of said diester.

5. In the process for the preparation of a salt of a sulphuric acid ester of a fatty acid diester of a glycol selected from the group consisting of the sulphuric acid esters of ethylene glycol dioleate and diethylene glycol dioleate by treatment thereof in the form of its free acid with a neutralizing agent, the improvement which comprises carrying out the treatment in a reaction medium which is an aqueous alcoholic solution wherein the alcohol is ethyl alcohol.

6. The process for the preparation of a salt of a sulphuric acid derivative of a fatty acid diester of a glycol, which comprises sulphonating a fatty acid diester of a glycol, and neutralizing the sulphonation mass in a reaction medium which is an alcoholic solution wherein the alcohol is ethyl alcohol.

7. The process for the preparation of a salt of a sulphuric acid ester of a fatty acid diester of a glycol, said diester being derivable from a fatty acid containing at least one member of the class consisting of the —OH group and the $$-\overset{|}{C}=\overset{|}{C}-$$

linkage, which comprises reacting said diester with a sulphonating agent and neutralizing the resulting sulphonation mass in an aqueous reaction medium comprising about one-half to about two parts by weight of a water-miscible monohydric alcohol for each part by weight of said diester.

8. The process for the preparation of a salt of a sulphuric acid ester of a fatty acid diester of a glycol, said diester being derivable from a fatty acid containing from 10 to 24 carbon atoms and at least one member of the class consisting of the —OH group and the $$-\overset{|}{C}=\overset{|}{C}-$$

linkage, which comprises reacting said diester with a sulphonating agent and neutralizing the resulting sulphonation mass with caustic alkali in a reaction medium comprising at least one-half part by weight of a water-miscible monohydric alcohol for each part by weight of said diester.

9. The process for the preparation of a salt of a sulphuric acid ester of a fatty acid diester of a glycol, said diester being derivable from a fatty acid containing from 16 to 18 carbon atoms and at least one member of the class consisting of the —OH group and the $$-\overset{|}{C}=\overset{|}{C}-$$

linkage, which comprises reacting said diester with a sulphonating agent and neutralizing the resulting sulphonation mass with caustic alkali in an aqueous reaction medium comprising about one-half to about two parts by weight of a water-miscible monohydric alcohol for each part by weight of said diester.

10. The process for the preparation of a salt of a sulphuric acid derivative of a fatty acid diester of a glycol, said diester being derivable from a fatty acid containing at least 10 to 24 carbon atoms, which comprises reacting said diester with a sulphonating agent and neutralizing the resulting sulphonation mass in a reaction medium which is an aqueous alcoholic solution wherein the alcohol is a monohydric alcohol.

11. The process for the preparation of a salt of a sulphuric acid ester of a fatty acid diester of a glycol, said diester being derivable from a fatty acid containing at least one member of the class consisting of the —OH group and the $$-\overset{|}{C}=\overset{|}{C}-$$

linkage, which comprises reacting said diester with a sulphonating agent and forming a salt of the resulting sulphuric acid ester of said diester by neutralizing the sulphonation mass with a caustic alkali in the presence of about one-half to about two parts by weight of a water-miscible monohydric alcohol for each part by weight of said diester.

12. The process for the preparation of a salt of a sulphuric acid ester of a fatty acid diester of a glycol selected from the group consisting of ethylene glycol dioleate and diethylene glycol dioleate which comprises reacting said diester with a sulphonating agent to form a sulphonation mass containing a free sulphuric acid ester of said diester and neutralizing the sulphonation mass with caustic soda in an aqueous reaction medium comprising about one-half to about two parts by weight of ethyl alcohol for each part by weight of said diester.

13. The process for the preparation of a salt of a sulphuric acid ester of a fatty acid diester of a glycol, said diester being derivable from a fatty acid containing from 10 to 24 carbon atoms and at least one member of the class consisting of the —OH group and the $$-\overset{|}{C}=\overset{|}{C}-$$

linkage, which comprises reacting said diester with a sulphonating agent to form a free sulphuric acid ester of said diester, and forming a salt of said free sulphuric acid ester by introducing the resulting sulphonation mass into a medium which is an aqueous alcoholic solution wherein the alcohol is a monohydric alcohol concurrently with an aqueous solution of a caustic alkali.

14. The process for the preparation of a salt of a sulphuric acid ester of a fatty acid diester of a glycol selected from the group consisting of ethylene glycol dioleate and diethylene glycol dioleate which comprises reacting said diester with 100% sulphuric acid to form a free sulphuric acid ester of said diester, and forming a salt of said free sulphuric acid ester by introducing the resulting sulphonation mass into an aqueous medium comprising about one-half to about two parts by weight of ethyl alcohol for each part by weight of said fatty acid diester concurrently with an aqueous solution of caustic soda.

15. A wetting and surface active agent comprising a salt of a sulphuric acid derivative of a fatty acid diester of a glycol obtainable by reacting a fatty acid diester of a glycol with a sulphonating agent and neutralizing the resulting sulphonation mass in an aqueous reaction medium comprising about one-half to about two parts by weight of a water-miscible monohydric alcohol for each part by weight of said fatty acid diester.

16. A wetting and surface active agent comprising an alkali metal salt of a sulphuric acid ester of a fatty acid diester of a glycol derivable from a fatty acid containing from 10 to 24 carbon atoms and at least one member of the class consisting of the —OH group and the $$-\overset{|}{C}=\overset{|}{C}-$$

linkage, obtainable by reacting said diester with a sulphonating agent and neutralizing the resulting sulphonation mass with a caustic alkali in an aqueous reaction medium comprising about one-half to about two parts by weight of a water-miscible monohydric alcohol for each part by weight of said fatty acid diester.

17. A wetting and surface active agent comprising an alkali metal salt of a sulphuric acid ester of a fatty acid diester of a glycol selected from the group consisting of ethylene glycol dioleate and diethylene glycol dioleate obtainable by reacting said diester with a sulphonating agent and neutralizing the resulting sulphonation mass with a caustic alkali in an aqueous reaction medium comprising about one-half to about two parts by weight of ethyl alcohol for each part by weight of said fatty acid diester.

GILBERT C. TOONE.